United States Patent [19]

Noguera

[11] Patent Number: 4,966,342
[45] Date of Patent: Oct. 30, 1990

[54] VIDEO CASSETTE RECORDER SUPPORT MECHANISM

[76] Inventor: Norlan Noguera, 5120 Santa Monica Blvd., Los Angeles, Calif. 90029

[21] Appl. No.: 396,338

[22] Filed: Aug. 21, 1989

[51] Int. Cl.$^5$ ............................................. F16M 11/00
[52] U.S. Cl. .................................. 248/172; 248/148; 248/918
[58] Field of Search ............... 248/172, 148, 237, 149, 248/670, 173, 672, 676–678, 918; 211/126; 182/45

[56] References Cited

U.S. PATENT DOCUMENTS

| | | | |
|---|---|---|---|
| 262,508 | 8/1882 | Thomson | 182/45 |
| 2,739,776 | 3/1956 | Terando | 248/172 X |
| 2,750,139 | 6/1956 | Young | 248/148 |
| 2,818,316 | 12/1957 | D'Andrade | 211/126 X |
| 2,867,248 | 1/1959 | Forney | 248/149 X |
| 2,882,810 | 4/1959 | Goettl | 248/237 X |
| 2,913,207 | 11/1959 | Eash | 248/148 |
| 4,570,804 | 2/1986 | Meenan | 211/126 |
| 4,819,448 | 4/1989 | Campbell et al. | 248/237 X |

Primary Examiner—Alvin C. Chin-Shue
Attorney, Agent, or Firm—Erik M. Arnhem

[57] ABSTRACT

A mechanism for supporting a video cassette recorder on the upper surface of a television receiver cabinet. Four substantially vertical posts extend downwardly from the rear end of a cassette-support platform to maintain the platform in a stable horizontal position in spite of the fact that the upper surface of the television cabinet slopes downwardly in a rearward direction. A foot structure is pivotably connected to each post to seat properly against the cabinet sloped surface.

2 Claims, 1 Drawing Sheet

U.S. Patent  Oct. 30, 1990  4,966,342
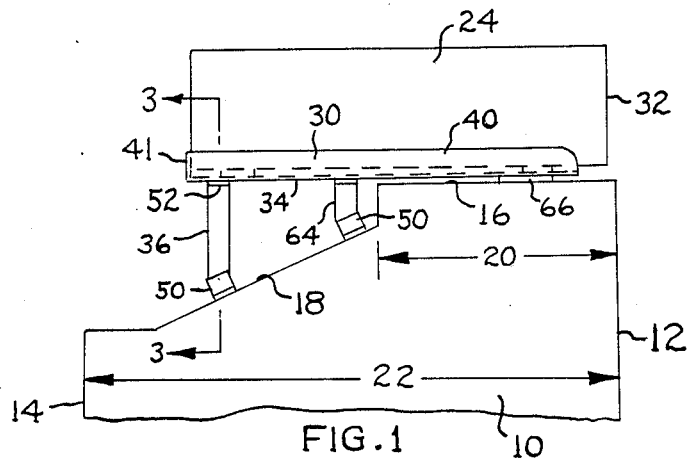
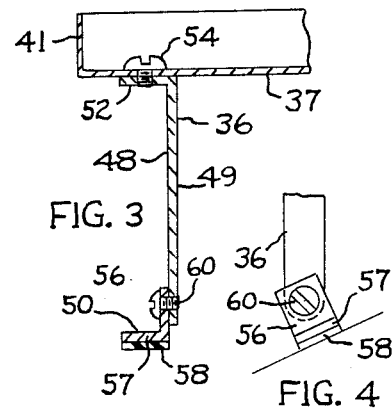
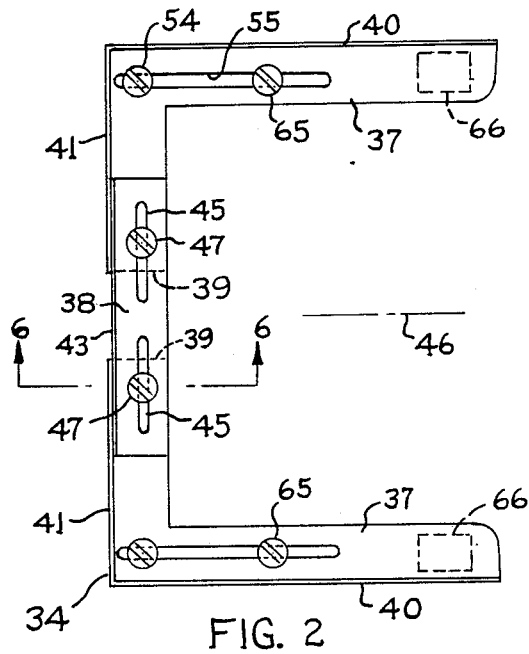
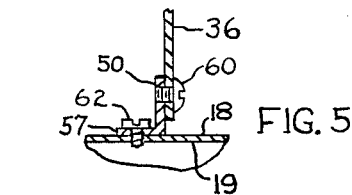
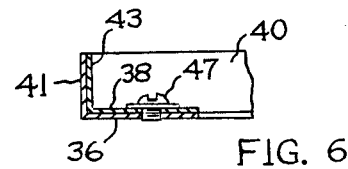
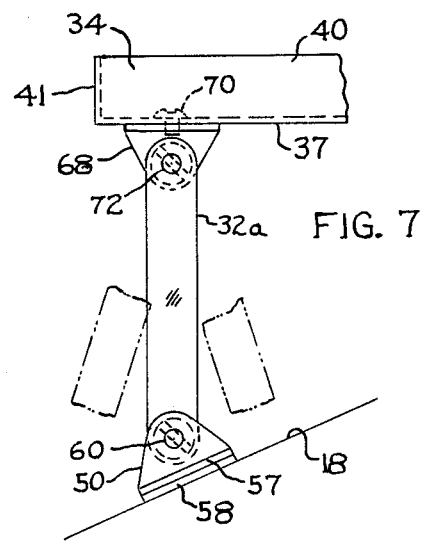

VIDEO CASSETTE RECORDER SUPPORT MECHANISM

BACKGROUND AND SUMMARY OF THE INVENTION

This invention relates to a mechanism for supporting a rectangular video cassette recorder on the upper surface of a portable television receiver cabinet.

In a typical portable television receiver cabinet the upper (top) surface of the cabinet usually includes a generally horizontal front surface section and a downwardly sloped rear surface section. The horizontal front surface section usually measures eight inches or less in depth. A typical video cassette recorder has front-to-rear depth of about fourteen inches. Therefore it is not feasible to directly support a video cassette recorder on the horizontal surface section of a television receiver (because the cassette recorder would tend to topple backwardly onto the downwardly sloped section of the television cabinet).

The present invention contemplates a video cassette recorder support mechanism that preferably includes a horizontal platform underlying the video cassette recorder. The front portion of the platform is adapted to rest on the front portion of the cabinet upper surface. Vertical posts extend downwardly from rear corner portions of the platform; a foot structure is pivotably connected to the lower end of each post for engagement with the sloped cabinet surface. The posts and associated foot structures cooperatively maintain the platform and cassette recorder in a horizontal stable attitude; the cassette recorder is thereby prevented from toppling backward onto the television cabinet sloped surface. Each foot structure may be attached to the sloped television receiver surface by a screw. Alternately the foot structure can frictionally engage the sloped surface.

The horizontal platform can have upstanding flanges on its rear edge and side edges, such that the video cassette recorder is prevented from sliding off the platform. The platform is preferably expansible and contractible in the lateral direction so that it can accept a range of different width video cassette recorders. Additionally, the platform-support posts are adjustably attached to the platform so that the platform can be adjusted in a front-to-rear direction on the television receiver cabinet in accordance with different video cassette recorder depth dimensions.

At least one other mechanism has been proposed for supporting a horizontal platform atop a portable television receiver cabinet. U.S. Pat. No. 3,930,701 to D. A. Otakie shows a horizontal platform 12 that is attached to a television receiver by means of an outer frame 14 and inner frame 16. Rods 18 extend between the two frames and underneath a carrying handle G to connect the platform to the television receiver. The structural arrangement proposed in U.S. Pat. No. 3,930,701 is relatively large and hence costly. Also, the arrangement of U. S. Pat. No. 3,930,701 can be used only with portable television receivers equipped with carrying handles. Many present day portable television receivers do not have such handles.

The present invention contemplates a relatively small light weight platform structure attachable to portable television receiver cabinets via two or more low cost post structures. The mechanism is adjustable to support various different video cassette recorders in the space above the television receiver.

THE DRAWINGS

FIG. 1 is a fragmentary side elevational view of a portable television receiver cabinet having a video cassette recorder supported thereon by a support mechanism constructed according to the present invention.

FIG. 2 is a top plan view of the support mechanism used in the FIG. 1 arrangement.

FIG. 3 is an enlarged fragmentary sectional view taken on line 3—3 in FIG. 1.

FIG. 4 is a fragmentary side elevational view of the post-foot assembly shown in FIG. 3.

FIG. 5 a fragmentary sectional view taken in the same direction as FIG. 3, but showing a screw attachment structure for securing the foot structure to the television cabinet.

FIG. 6 is a fragmentary sectional view on line 6—6 in FIG. 2.

FIG. 7 is a side elevational view of an alternative post-foot assembly that can be used in practice of the invention.

DESCRIPTION OF A PREFERRED EMBODIMENT OF THE INVENTION

FIG. 1 shows in side elevation a portable television receiver cabinet 10 having a front viewing surface 12, and a rear surface 14. The upper surface of the cabinet includes a generally horizontal surface 16 near the front of the cabinet, and a downwardly sloped surface 18 near the rear of the cabinet. Ordinarily horizontal surface 16 measures eight inches or less in the front-to-rear direction designated by numeral 20. The television cabinet front-to-rear dimension 22 is ordinarily eighteen inches or less. Surface 18 ordinarily has a downward slope of about twenty degrees. These dimensional relationships can vary from one make (manufacturer) to another, and from one screen size to another screen size.

FIG. 1 shows in side elevation a video cassette recorder 24 supported above television cabinet 10 by a support mechanism 30. The cassette recorder has a front surface 32 oriented substantially in the same vertical plane as the television cabinet front surface 12, so that front surface 32 is readily accessible for operation of the cassette recorder.

Support mechanism 30 includes a horizontal platform (or tray) 34, and two downwardly extending post structures 36 located substantially directly below the rear corners of the platform. Platform 34 may be constructed in various different ways. As shown in FIG. 2, the platform comprises two L-shaped plates 37 and a straight connector plate 38 that overlaps the inner edges 39 of plates 37.

Each plate 37 has an upstanding flange 40 on its outer side edge and an upstanding flange 41 on its rear edge. Connector plate 38 has an upstanding flange 43 on its rear edge. Flange 43 facially engages the front faces of flanges 41. Connector plate 38 has two laterally extending slots 45 that accommodate the shank areas of screws (retainers) 47. Screws 47 extend into threaded openings in plates 37, thereby clamping plates 37 to connector plate 38.

It should be noted that slots 45 enable plates 37 to be adjusted transversely toward or away from the front-to-rear axis 46 of the defined platform 34. Screws 47 act as clamp type retainers to hold the plates in adjusted positions. Plate 37 adjustments are used to vary the effective width of platform 34, to thus mate with different video cassette recorder widths. A typical video cassette recorder has a width of approximately eighteen inches, but a specific recorder could be wider or narrower than eighteen inches. Plates 37 will be adjusted laterally so that side flanges 40 are against (or slightly spaced from) the side surfaces of cassette recorder 24. The rear face of the recorder will be in close proximity to plate flanges 41 and 43. The arrangement serves to retain the recorder against inadvertant slidable shifting off of the platform. Platform 34 forms a tray having upstanding flanges on its side edges and on its rear edge. The tray is open along its front edge.

FIG. 3 shows the structure of each post 36. The post is a bar structure having two flat side surfaces 48 and 49, one of which is facially engaged with a foot structure 50. A flange 52 extends right angularly from the upper end of post 36 along the undersurface of plate 37. A clamp screw 54 extends through a slot 55 in plate 37 into a threaded hole in flange 52. By loosening screw 54 it is possible to adjust the position of post 36 along the length of slot 55, i.e., parallel to the front-to-rear axis 46 (FIG. 2). The purpose of such an adjustment is to enable the post and associated foot structure 50 to fit into the available space between platform (tray) 34 and television receiver cabinet surface 18. In this connection, it should be noted that differences in television set size and manufacture can affect the vertical spacing between each rear corner area of platform 34 and sloped surface 18. Ordinarily it is desired to have each post 36 at or near the rear corner of platform 34. However, if in a particular instance the vertical space proves to be too great the post can be shifted forwardly along slot 55 to a point where platform 34 assumes a horizontal attitude properly supporting the weight of cassette recorder 24. Ordinarily the recorder will weigh approximately twenty pounds.

Each foot structure 50 should have its lower face engaged flatwise against sloped surface 18 if the foot structure is to properly serve its support function. As shown in FIG. 3, foot structure 50 comprises an angle member having an upstanding leg 56 engaged flatwise against side surface 48 of post 36. A second leg 57 of the angle member has a resilient rubber pad 58 thereon engageable flatwise on cabinet sloped surface 18. A contact adhesive (not shown) may be applied to the lower face of pad 58 to increase the adhesion of the pad on surface 18

A clamp screw 60 extends through a transverse hole in post 36 into a threaded hole in leg 56 of the foot member. With screw 60 slightly unloosened, the foot structure 50 can be pivotably adjusted around the screw 60 axis so that rubber pad 58 seats flatwise against sloped surface 18. The foot structure is held in its adjusted position by tightening screw 60 in the threaded hole in post 36; the flatness of bar surface 48 and leg 56 provides a relatively large contact area and hence a relatively high clamp force.

FIG. 5 illustrates an alternate foot structure construction. In this case the foot structure is affixed to the cabinet sloped surface 18 by means of a sheet metal screw 62 extended through leg 57 into a drilled hole in cabinet upper wall 19. There is no need for rubber pad 58 in the FIG. 5 arrangement. As shown in FIG. 5, the pivot screw 60 extends into a threaded hole in foot structure 50. The threaded hole can be formed in post 36 (FIG. 3) or in foot structure 50 (FIG. 5). Also, the foot structure can be located on the outer side surface 48 of post 36 (as shown in FIGS. 3 and 5) or on the inner side surface 49 of the post.

The arrangement of FIG. 1 contemplates two relatively long posts 36 at or near the rear corners of platform 34. Two additional posts 64 can be connected to platform 34 forwardly from posts 36. Posts 64 are constructed similarly to posts 36 except that they are materially shorter. Each post 64 has a foot structure 50 associated therewith. A screw 65 (FIG. 2) is used to attach each post 64 to platform 34; each screw 65 can be adjusted in a front-to-rear direction.

The front end portion of platform 34 rests on horizontal surface 16 of cabinet 10. In order to minimize the possibility of slippage between the platform and cabinet surface 16 two rubber pads 66 may be affixed to the lower faces of plates 37 (FIGS. 1 and 2). The rubber pads grip surface 16, to thus prevent slippage of platform 34 from its designated position wherein the front face 32 of the cassette recorder is substantially vertically aligned with the front face 12 of the television cabinet. The weight of the cassette recorder assists pads 66 in gripping cabinet surface 16. Cabinet surface 16 is nominally a horizontal surface, but in some cases it can have a slight slope. Pads 66 will compensate for such a slope.

The load imposed on platform 34 by video cassette recorder 24 will be handled primarily by pads 66 and the two rear posts 36. Posts 64 may be omitted in many instances.

FIG. 7 fragmentarily shows an alternate rear post construction. The upper flange 52 (FIG. 3) is replaced by a pivotably adjustable angle member 68 that is constructed essentially the same as angle member 50 (FIG. 5). A screw 70 fastens the angle member to the undersurface of plate 37. The pivot screw 72 can be tightened to hold post 32a in a true vertical position or in positions slightly angled from the vertical, as shown by the dashed lines in FIG. 7.

The FIG. 7 post structure can be fastened to platform 34 at a fixed location near the platform rear corner. Slight angular adjustments of the post around the screw 72 axis will be used to bring the foot structure 50 into contact with sloped surface 18. The foot structure can be adjusted around the axis of clamping screw 60 to ensure adequate surface engagement between structure 50 and surface 18. As shown in FIG. 7, leg 57 of the foot structure can be widened to increase its contact area with cabinet surface 18.

In some instances it might be possible to eliminate platform 34. For example, each angle member 68 could be attached directly to the undersurface of video cassette recorder 24 by means of a sheet metal screw extending upwardly through the horizontal leg of member 68 into a hole drilled in the cassette recorder bottom wall. Post 32a would then have a pivotably adjustable connection with the cassette recorder.

The drawings necessarily show specific forms that the invention can take. However it will be understood that the invention can be practiced in other ways.

What is claimed is:

1. A mechanism for supporting a rectangular video cassette recorder on the upper sloped surface of a television receiver cabinet; said support mechanism comprising a rectangular platform (34) having a front-to-rear central axis (46), and two vertical posts (36) extending downwardly from said platform;

said rectangular platform comprising two horizontal plates (37) adapted to underlie rear corner sections and side sections of a cassette recorder; each horizontal plate having a rear edge adapted to parallel a rear face of recorder, an upstanding rear flange (41) extending upwardly from the plate rear edge, whereby a cassette recorder is prevented from movement off of the platform;

said platform further comprising a connector plate (38) spanning the platform front-to-rear axis (46), with sections thereof overlying portions of said horizontal plates (37); said connector plate having a horizontal slot means (45) extending normal to the platform front-to-rear axis; and threaded retainer means (47) extending through said slot means (45) into each horizontal plate whereby said horizontal plates (37) are retained in selected positions of lateral adjustment; said connector plate having an upstanding flange (43) extending upwardly therefrom in facial contact with said upstanding rear flanges (41) on said horizontal plates, whereby the rear edges of the horizontal plates maintain a parallel relation with the rear face of the recorder; each horizontal plate having a side edge and a slot (55) extending in a front-to-rear direction parallel to the plate side edge; each said vertical post (36) comprising a vertical bar having a horizontal flange (52) at its upper end, a threaded clamp element (54) extendable downwardly through one of said slots into said horizontal flange (52) for holding said post in selected positions of adjustment measured in the direction of the slot, a foot structure (50) at the lower end of said bar, and a pivotal connection (60) between said foot structure and said bar, whereby the lower surface of the foot structure is adapted to seat flatwise on a downwardly sloped surface of a television receiver cabinet.

2. The support mechanism of claim 1 wherein each said horizontal plate (37) has an L-shaped configuration in a top plan direction; said connector plate (38) having an elongated rectangular configuration in a top plan direction, with the longest dimension of the rectangle extending normal to the front-to-rear axis of the platform.

* * * * *